US007606409B2

(12) United States Patent
Funakoshi

(10) Patent No.: US 7,606,409 B2
(45) Date of Patent: Oct. 20, 2009

(54) DATA PROCESSING EQUIPMENT, INSPECTION ASSISTANCE SYSTEM, AND DATA PROCESSING METHOD

(75) Inventor: Tomohiro Funakoshi, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 747 days.

(21) Appl. No.: 11/272,896

(22) Filed: Nov. 15, 2005

(65) Prior Publication Data

US 2006/0111879 A1 May 25, 2006

(30) Foreign Application Priority Data

Nov. 19, 2004 (JP) ............................. 2004-335271

(51) Int. Cl.
*G06K 9/00* (2006.01)
*H04N 7/18* (2006.01)
*G06F 17/50* (2006.01)

(52) U.S. Cl. ....................................... 382/141; 348/129

(58) Field of Classification Search ................. 382/141, 382/144, 145, 149, 150, 224, 100; 348/86–92, 348/125, 126, 129; 703/1

See application file for complete search history.

(56) References Cited

U.S. PATENT DOCUMENTS 5,544,256 A * 8/1996 Brecher et al. .............. 382/149
7,113,628 B1 * 9/2006 Obara et al. ................ 382/149
7,116,816 B2 * 10/2006 Tanaka et al. ............... 382/149
2004/0223639 A1 11/2004 Sato

FOREIGN PATENT DOCUMENTS

JP 10-135288 5/1998
JP 2001-156141 6/2001
JP 2004-134758 4/2004
JP 2004-146716 5/2004
JP 2004-281681 10/2004

* cited by examiner

*Primary Examiner*—Yon Couso
(74) *Attorney, Agent, or Firm*—McDermott Will & Emery LLP

(57) ABSTRACT

A data processing apparatus, which is connected to an inspection tool and an review tool via a network, automatically receives inspection result file regarding defect information from the inspection tool and image information from the review tool. Moreover, the data processing apparatus makes comparative check between the defect, image, and attribute information outputted from the inspection tool and the defect, image, and attribute information observed in the review tool. Finally, the data processing apparatus displays, on its window, both of the above-described information in a manner of being organized and arranged side by side.

20 Claims, 10 Drawing Sheets

FIG. 3

RDC PARAMETER TABLE

| |
|---|
| MAXIMUM GRAY LEVEL DIFFERENCE |
| REFERENCE-IMAGE AVERAGE GRAY LEVEL |
| DEFECT-IMAGE AVERAGE GRAY LEVEL |
| POLARITY |
| INSPECTION MODE |
| DEFECT AREA |
| DEFECT-PIXEL NUMBER |
| DEFECT-SIZE WIDTH |
| DEFECT-SIZE HEIGHT |
| DEFECT-SIZE RATIO (WIDTH/HEIGHT) |
| DEFECT-PIXEL DIFFERENTIAL VALUE ON DEFECT IMAGE |
| DEFECT-PIXEL DIFFERENTIAL VALUE ON REFERENCE IMAGE |

DATA PROCESSING EQUIPMENT, INSPECTION ASSISTANCE SYSTEM, AND DATA PROCESSING METHOD

BACKGROUND OF THE INVENTION

1. Field of the Invention

The present invention relates to an outward-appearance confirmation operation for a product or a part which is under fabrication. More particularly, it relates to a data processing apparatus, an inspection-operation assistance system, and a data processing method for assisting the efficiencies of condition determination operations of an inspection tool and an review tool. Here, the inspection tool is used for detecting foreign substances or pattern defects on the surface of an inspection target such as semiconductor wafer, photo mask, magnetic disc, or liquid-crystal board. The review tool is used for observing the defects such as the foreign substances.

2. Description of the Related Art

In semiconductor fabrication steps, the foreign substances or pattern defects on the wafer surface become a cause for product failures. On account of this, it becomes necessary to monitor all the time whether or not a problem exists in the fabrication apparatus and fabrication environment. This monitoring is performed by quantifying the defects such as the foreign substances, pattern defects, or outward-appearance failures detected by the inspection tool. Moreover, it becomes also necessary to confirm whether or not the defects will exert fatal influences on the product. This confirmation is performed by observing such factors as shapes of the defects using the review tool.

From conventionally, the review like this has been performed by human's visual checking. This has resulted in existence of the following problems: Namely, depending on a person who makes the observation, a bias exists in the classification result of the defect position or defect type of an observation target. Also, the definition of a defect to be observed could not be determined uniquely. In order to solve these problems, the introduction of such techniques as the Automatic Defect Review (: ADR) and the Automatic Defect Classification (: ADC) has recently started. In these techniques, the apparatus automatically makes judgments on the size, shape, and type of a defect using the image processing technologies. For example, in observing (i.e., reviewing) an inspected part (e.g., a pattern on a chip formed on a semiconductor wafer) using a SEM review tool to which the SEM (: Scanning Electron Microscopy) is applied, a system has been devised which allows the operation to be efficiently performed while reducing a load imposed on its operator (refer to, e.g., JP-A-10-135288).

In recent years, in accompaniment with the miniaturization of machining dimensions of semiconductor devices, defects have become more and more miniaturized. Also, depending on an inspection condition of the inspection tool for extracting the defects, there exist defects extractable thereby and ones not extractable thereby. In the situation like this, there have existed the increasingly growing needs for changing the inspection condition of the inspection tool to output a plurality of defects extracted at the time of each inspection condition in a manner of being collected at one time. Also, in accompaniment with the high-sensitivity implementation of the inspection tool, output noise from the inspection tool becomes larger. Accordingly, in some cases, the number of the defects detected by the one-time inspection turns out to exceed tens of thousands. In order to eliminate this noise, there has been known a methodology of classifying the defects during the inspection and eliminating the noise by using the RDC (: Real-Time Defect Classification) function on the inspection tool. This methodology, however, requires that comparative check be made between the maximum amount of information available which is outputted from the inspection tool and the maximum amount of information available which is outputted from the review tool in order to determine the defect detection condition in the inspection tool and a condition at the time of exerting the RDC function for eliminating the noise. The proposals (e.g., JP-A-2001-156141(FIG. 2)) have been made concerning the technique for facilitating the defect analysis by organizing the defect ID (: Identification number) information and coordinate information outputted from the inspection tool and the ADR information and ADC information outputted from the review tool. No consideration, however, has been given up to the above-described RDC function.

SUMMARY OF THE INVENTION

As described above, the operation of detecting an outward-appearance failure is of the utmost importance in enhancing the yield. Meanwhile, in accompaniment with the miniaturization of the semiconductor devices, the inspection tool is requested to exhibit a capability or performance of being capable of detecting the outward-appearance failure more sensitively. As a result, an inspection tool which is capable of detecting the outward-appearance failure with a high sensitivity is now making its debut. This high-sensitivity implementation of the inspection tool has made it possible to detect microscopic defects. In accompaniment therewith, however, the number of the defects thus detected is becoming enormous. In accompaniment herewith, further, the number of defects that must be confirmed in a review operation for confirming the shape of the outward-appearance failure is also becoming enormous. Accordingly, the information amount which must be fed back for determining the inspection condition and the RDC condition is increasing at an explosive rate. Consequently, it is becoming more and more difficult to accurately determine the inspection condition. From conventionally, in many cases, the comparative-check operation between the information from the inspection tool and the information from the review tool has been performed by human's handwork. This has resulted in a problem that the comparative-check method comes to differ depending on a person who performs the operation, and that a variation occurs in the inspection condition determined based on the comparative-check result.

It is an object of the present invention to make it possible to easily acquire the information which becomes a guideline for determining the inspection condition. Also, it is another object thereof to implement an efficiency improvement in the defect extraction by shortening a time needed until the determination of the inspection condition.

A mode for carrying out the present invention is as follows: A data processing apparatus connected to an inspection tool and an review tool via a network, or an inspection-operation assistance system including the inspection tool, the review tool, and the data processing apparatus. The data processing apparatus automatically receives inspection result file from the inspection tool and image information from the review tool. Moreover, the data processing apparatus makes the comparative check between the defect, image, and attribute information outputted from the inspection tool and the defect, image, and attribute information observed in the review tool. Finally, the data processing apparatus displays, on its display window, both of the above-described information in a manner of being organized and arranged side by side.

A concrete mode of the present invention is as follows: The data processing apparatus selects at least one selection condition for selecting inspection result file to be displayed on the display window, or arbitrarily combines selection conditions through the selection. In more detail, at least the one selection condition is selected based on coordinate data on defects detected by the inspection tool. Otherwise, at least the one selection condition is determined based on the presence or absence of images of the defects acquired by the review tool.

Another concrete mode of the present invention is as follows: The data processing apparatus displays, on the display window, defect attribute parameters of the defects as the inspection result file outputted from the inspection tool. Otherwise, the data processing apparatus displays, on the display window, images of the defects as the inspection result file outputted from the inspection tool. In more detail, the defect attribute parameters or the images of the defects are acquired using a plurality of inspection conditions.

Still another concrete mode of the present invention is as follows: The data processing apparatus displays, on the display window, classification information on the defects classified by the review tool based on the inspection result file from the inspection tool.

Another mode for carrying out the present invention is as follows: A data processing method is disclosed which includes steps of performing transfer/reception of information and images with an review tool, the review tool acquiring images of outward appearance of defects based on inspection result file from an inspection tool, wherein the inspection tool detecting the defects of a target to be detected and outputting first defect information as the inspection result file, and displaying the defect information from the inspection tool and second defect information from the review tool including the images in such a manner that both of the first and second defect information are arranged side by side on a display window.

A more concrete mode of this data processing method is the inclusion of a step of selecting at least one selection condition for selecting defect information to be displayed on the display window, or arbitrarily combining selection conditions through the selection. In more detail, at least the one selection condition is selected based on coordinate data on defects detected by the inspection tool. Otherwise, at least the one selection condition is determined based on the presence or absence of images of the defects acquired by the review tool.

Another concrete mode of this data processing method is the inclusion of a step of displaying, on the display window, defect attribute parameters of the defects as the inspection result file outputted from the inspection tool, or displaying, on the display window, images of the defects as the inspection result file outputted from the inspection tool. In more detail, the defect attribute parameters or the images of the defects are acquired using a plurality of inspection conditions.

Still another concrete mode of this data processing method is the inclusion of a step of displaying, on the display window, classification information on the defects classified by the review tool based on the inspection result file from the inspection tool.

According to the present invention, it becomes possible to easily acquire the information which becomes a guideline for determining the inspection condition. Also, it becomes possible to implement an efficiency improvement in the defect extraction by shortening a time needed until the determination of the inspection condition.

Other objects, features and advantages of the invention will become apparent from the following description of the embodiments of the invention taken in conjunction with the accompanying drawings.

BRIEF DESCRIPTION OF THE DRAWINGS

FIG. 3 is a window diagram for illustrating examples of the defect attributes outputted from the defect inspection tool;

DETAILED DESCRIPTION OF THE INVENTION

Figure 1:
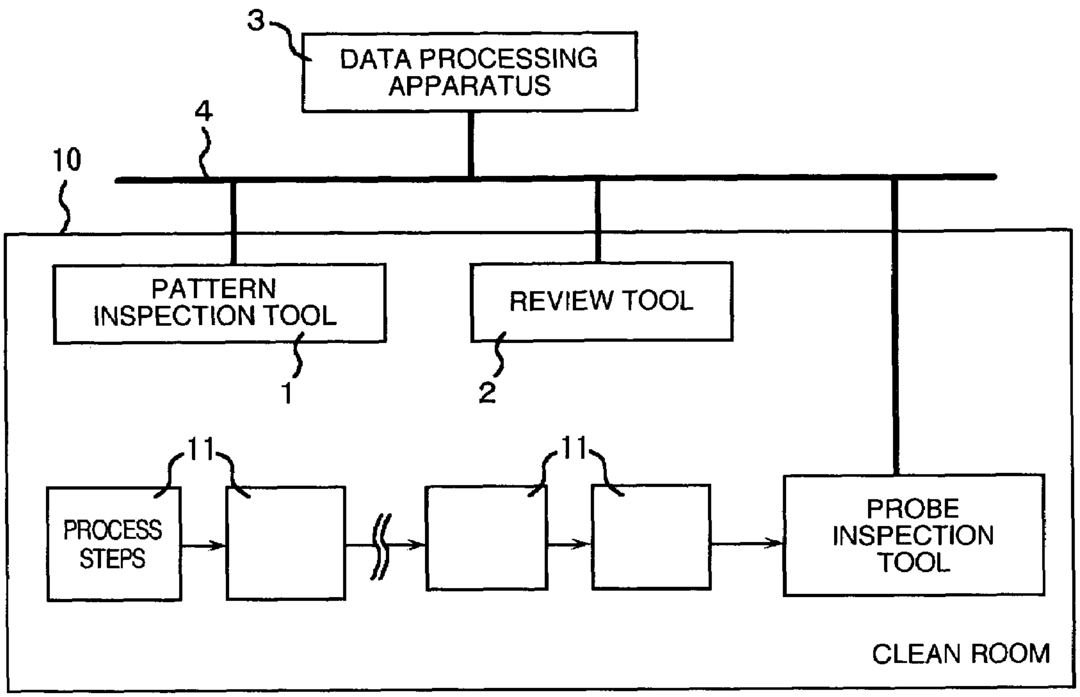
FIG. 1 is an entire configuration diagram for illustrating a defect confirmation-operation assistance system including a data processing apparatus of the present invention.
Figure 2:
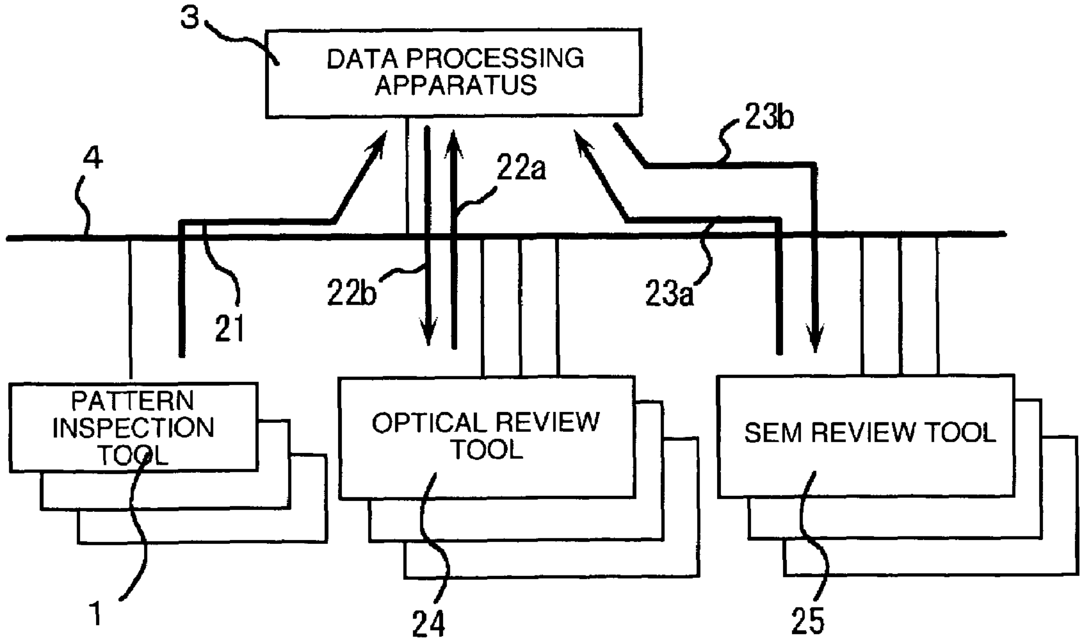
FIG. 2 is a system configuration diagram for illustrating exchanges of defect, attribute, ADR-image information outputted from a defect inspection tool and ADR/ADC information outputted from a defect review tool.

Hereinafter, referring to FIG. 1 and FIG. 2, the explanation will be given below concerning the entire configuration of the present invention. Here, an embodiment will be illustrated which results from applying the present invention to the semiconductor fabrication line. Usually, semiconductor process steps 11 are located within a clean room 10 where a clean environment is maintained. Components set up within the clean room 10 are an outward-appearance inspection tool 1 for performing the detection of pattern defect of product wafers, and an review tool 2 for performing the observation (i.e., review) of the pattern defect based on data from the pattern inspection tool 1. The pattern inspection tool 1 and the review tool 2 are connected via a communications line 4 to a data processing apparatus 3 with which the tools 1 and 2 perform the transfer/reception of the inspection and image information. Wafers, which become the products, flow along the semiconductor process steps 11 in the lot unit. The pattern inspection processing is performed as follows: After the processings along the steps have been terminated for which the pattern inspection had been beforehand determined to be performed, the product wafers are transferred to the pattern inspection tool 1 by a worker or a transportation equipment.

Inspection result file 21 acquired when the pattern inspection has been performed are managed in the data processing apparatus 3, using the lot ID, wafer ID, inspection step, and inspection time-and-date. Examples of the inspection result file 21 are defect coordinate information, defect ADR-image information, defect attribute information (i.e., RDC information), and the like. Examples of the conceivable defect attribute information are information mentioned in FIG. 3. The defect attribute information, together with the other inspection result file, are transmitted by text data in a determined format. The inspection result file outputted from the inspection tool according to the conventional techniques, basically, had been only the information such as defect ID, the coordinate, and the size.

The wafers, whose pattern inspection has been terminated, are transferred to the review tool 2 for observing the pattern defect. The review tool 2 extracts a predetermined wafer from within each lot, then performing the review. At the time of performing the review, the review tool 2 acquires the inspection result file 21 from the data processing apparatus 3, using, as key information, the information on the wafer which is the review target (i.e., the lot ID, wafer ID, and inspection step). This inspection result file 21 includes not only the defect ID and coordinate data, but also the ADR image acquired at the time of the inspection.

The inspection result file 21 outputted from the pattern inspection tool 1 are enormous amount of data. Consequently, defect coordinate information. 22*b* or 23*b*, which are extracted by the data processing apparatus 3 using a plurality of filter functions, are transmitted to an optical review tool 24 or a SEM (Scanning Electron Microscope) review tool 25 via the communications line 4.

Based on the extracted defect coordinate information 22*b* or 23*b*, the optical review tool 24 or the SEM review tool 25 acquires an image of the defect-detecting portion. Then, using the image, the review tool 24 or 25 performs the defect classification by an ADC function mounted on each review tool. Moreover, as ADR/ADC information 22*a* or 23*a*, the resultant defect classification information are transmitted to the data processing apparatus 3 via the communications line 4.

Next, referring to FIG. 4 and FIG. 5, the explanation will be given below concerning in what manner these two kinds of information (i.e., the defect coordinate information, defect attribute, and image data outputted from the inspection-tool side, and the ADR/ADC information outputted from the review-tool side) will be displayed on the data processing apparatus 3 of the present invention.

Figure 4:
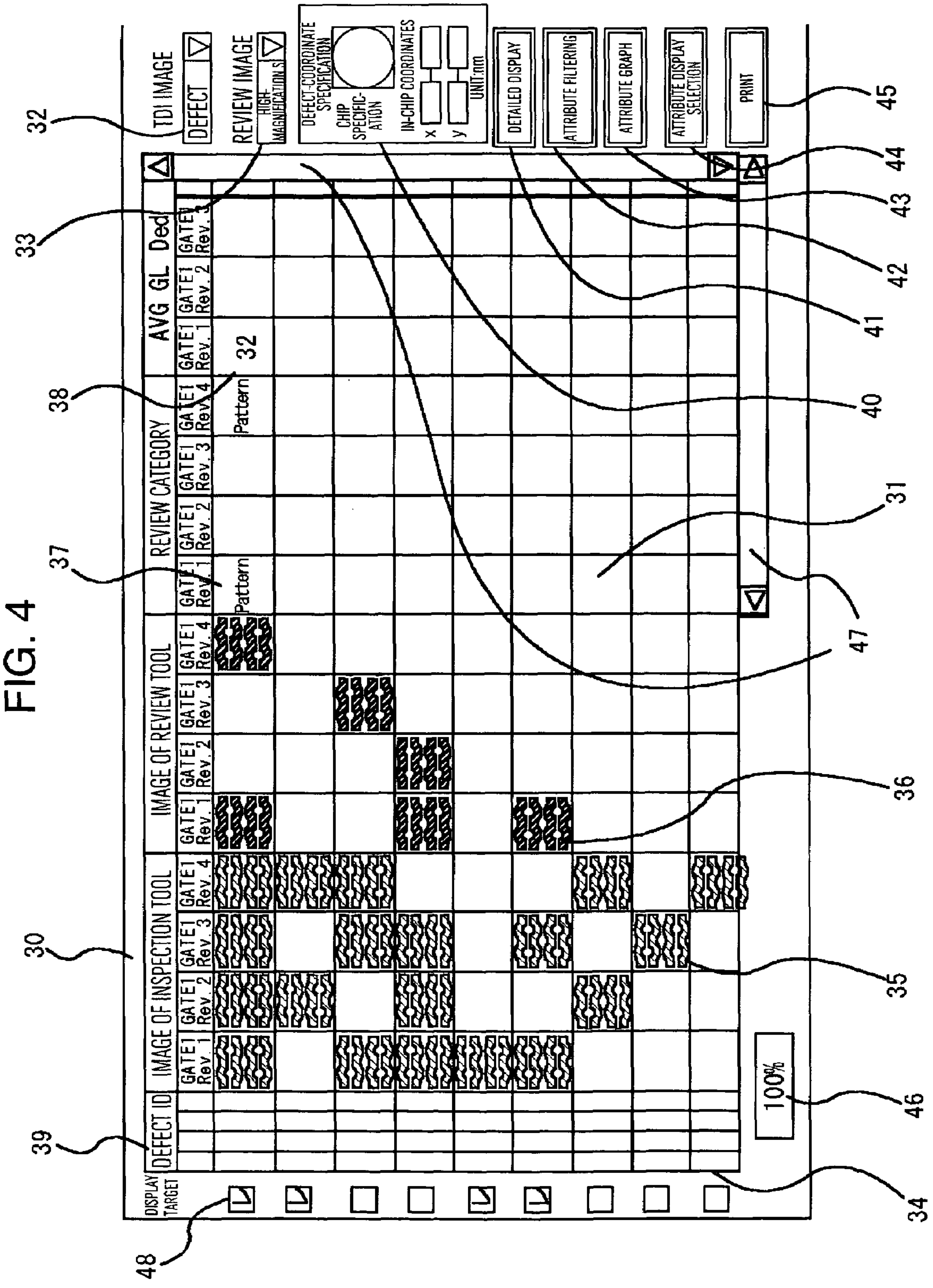
FIG. 4 is a window diagram displayed on the data processing apparatus.
Figure 5:
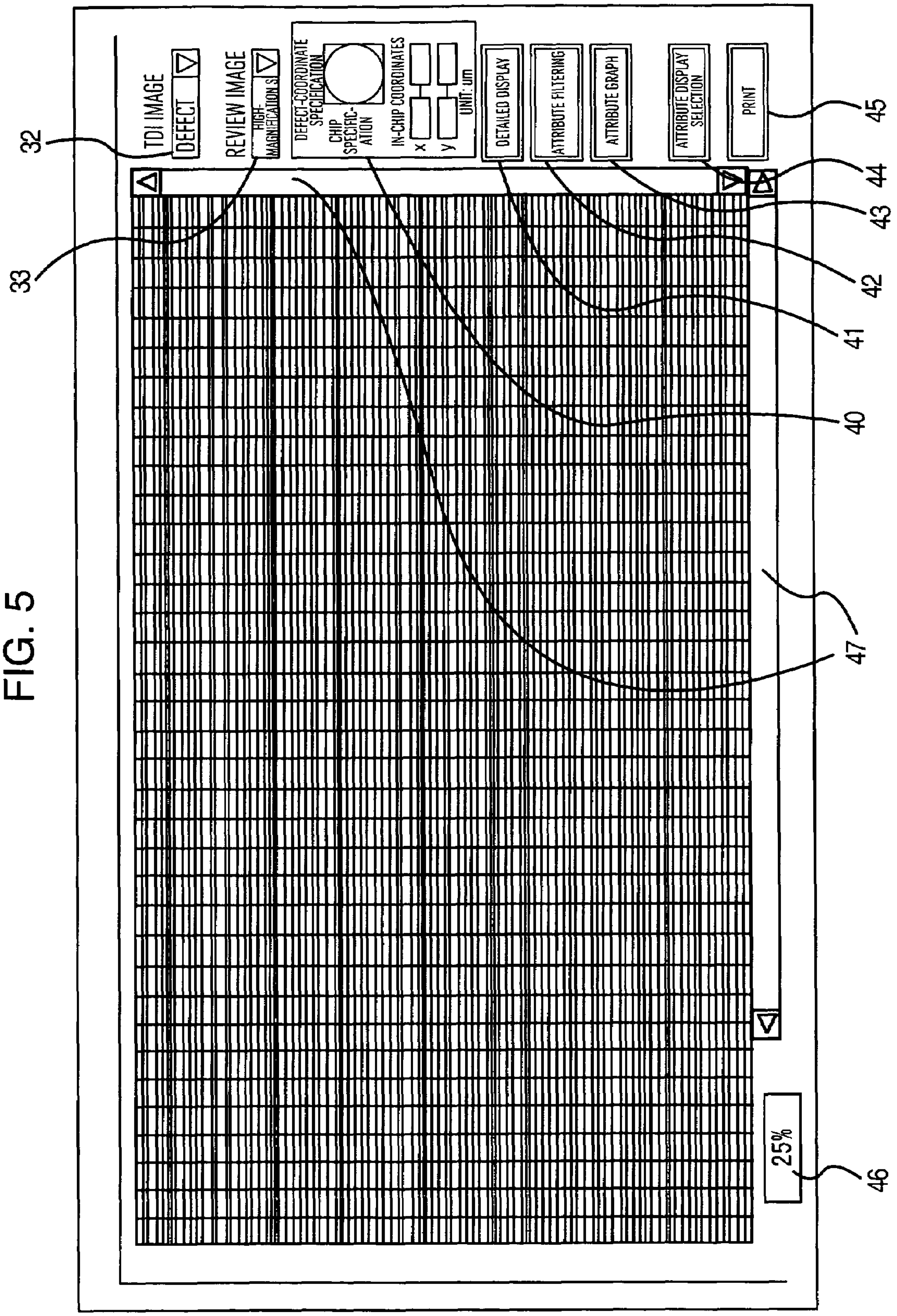
FIG. 5 is a window diagram in the case where the window in FIG. 4 is downsized and entirely-displayed.

In order to allow these two kinds of large amount of information (i.e., the inspection/image data outputted from the inspection-tool side, and the ADR/ADC information outputted from the review-tool side) to be displayed in a manner of being arranged side by side, a window 30 illustrated in FIG. 4 is prepared on the data processing apparatus 3.

The window 30 includes the following configuration components: A table 31, pull-down menus 32 and 33 for selecting an image to be displayed, a magnification setting section 46 for changing display magnification, a die-index specification display section 40 for filtering information to be displayed, a button 41 for individually displaying detailed information for each defect, a button 42 for selecting attribute range of a defect to be displayed, a button 43 for displaying attribute graph of a defect displayed, a button 44 for selecting defect attributes to be displayed on the table 31, a button 45 for printing the table 31 by printer, and, as a button for selecting defect information to be displayed, a button 48 for directly selecting a defect. Here, on the table 31, a defect-ID display field 34 for displaying defect IDs outputted from the inspection-apparatus side, and ADR image 35 and defect attribute information 38 outputted therefrom, and ADR image 36 and ADC classification information 37 outputted from the observation-apparatus side are all displayed as one list under a title 39. Also, on the table 31, an arbitrary location is displayable using a scroll bar 47. Comparative check is made between the coordinates of defects whose inspection has been performed using a plurality of inspection conditions. Then, with respect to defects which are judged to be the same defect, information thereon are displayed in a manner of being arranged side by side in the same column within the table 31. Fields of the ADR image 35 and the ADR image 36 have become blank fields for the defect IDs with no image.

As units for permitting an arbitrary location to be displayed easily, the scroll bar 47 and further, the magnification setting section 46 for changing the window display magnification are prepared within the present window. The display magnification is arbitrarily settable, and accordingly it is possible to permit a wider range of the table 31 to be displayed as is illustrated in FIG. 5.

On the table 31, clicking on the title 39 allows the information included within the table to be sorted in an ascendant or descendant order on the basis of information on a title clicked on. This sorting makes it possible to immediately understand what types of defects have what types of attributes. This sorting also makes it possible to immediately confirm in what manner a defect seemingly appears which the operator really wishes to find out, and whether or not a defect which the operator is now watching is a pseudo defect.

In this example of this table 31, although the information associated with a single defect ID are displayed in a manner of being arranged side by side in the transverse direction, arranging the information side by side in the longitudinal direction is also allowable, of course.

Next, referring to FIG. 6 to FIG. 10, the explanation will be given below concerning the other functions included within the window 30 in FIG. 4. Incidentally, it is needless to say that the explanation thereof will not limit the scope of the claims of the present invention.

Figure 6:
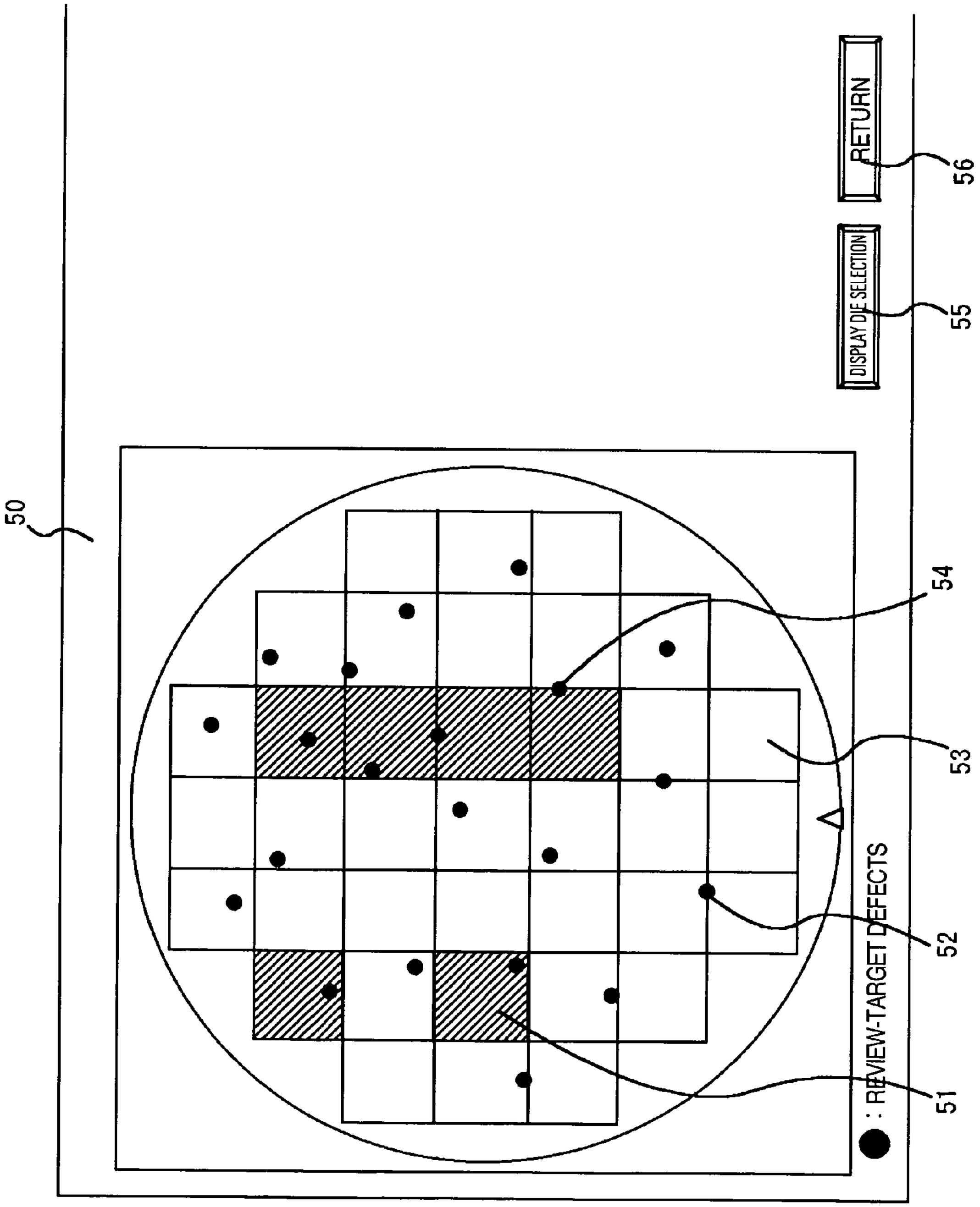
FIG. 6 is a window diagram in the case of selecting a die on which defects to be displayed in FIG. 4 and FIG. 5 distribute.

Double-clicking on chip specification of the die-index specification display section 40 within the window 30 in FIG. 4 switches the window 30 to a window 50 illustrated in FIG. 6. The window 50 includes a map 53, a button 55 for being pressed for determining specification of a defect to be displayed on the window 30 in FIG. 4 after having performed the specification, and a button 56 for being pressed when returning the window 50 to the window 30 in FIG. 4. Here, on the map 53, a die layout based on die-layout information outputted from the inspection tool is displayed, including the presence or absence of the review for a detection defect position as is indicated by an unreviewed defect position 52. Clicking on a die within the die layout illustrated on the window 50 inverts its color as is illustrated by a selected-display die section 51, thereby displaying that the die has been selected. Detection defects indicated on the map are displayed in a manner of being classified by color like a reviewed defect position 54 and the unreviewed defect position 52. This color classification becomes a guideline for indicating which die should be selected in order that reviewed defects will be displayed on the window 30 in FIG. 4 with a high efficiency. After having selected a necessary die, the button 55 is pressed in order to cause its result to be reflected on the window 30 in FIG. 4. After that, the button 56 is pressed, which returns the window 50 to the window 30 in FIG. 4. In the die-index specification display section 40 in FIG. 4, in order to extract the defects to be displayed on the window 30 in FIG. 4, it is also possible to directly input minimum value or maximum value of the X coordinates and Y coordinates within the die. This is performed in order to limit an in-die area of the defects to be displayed on the window 30 in FIG. 4.

Figure 7:
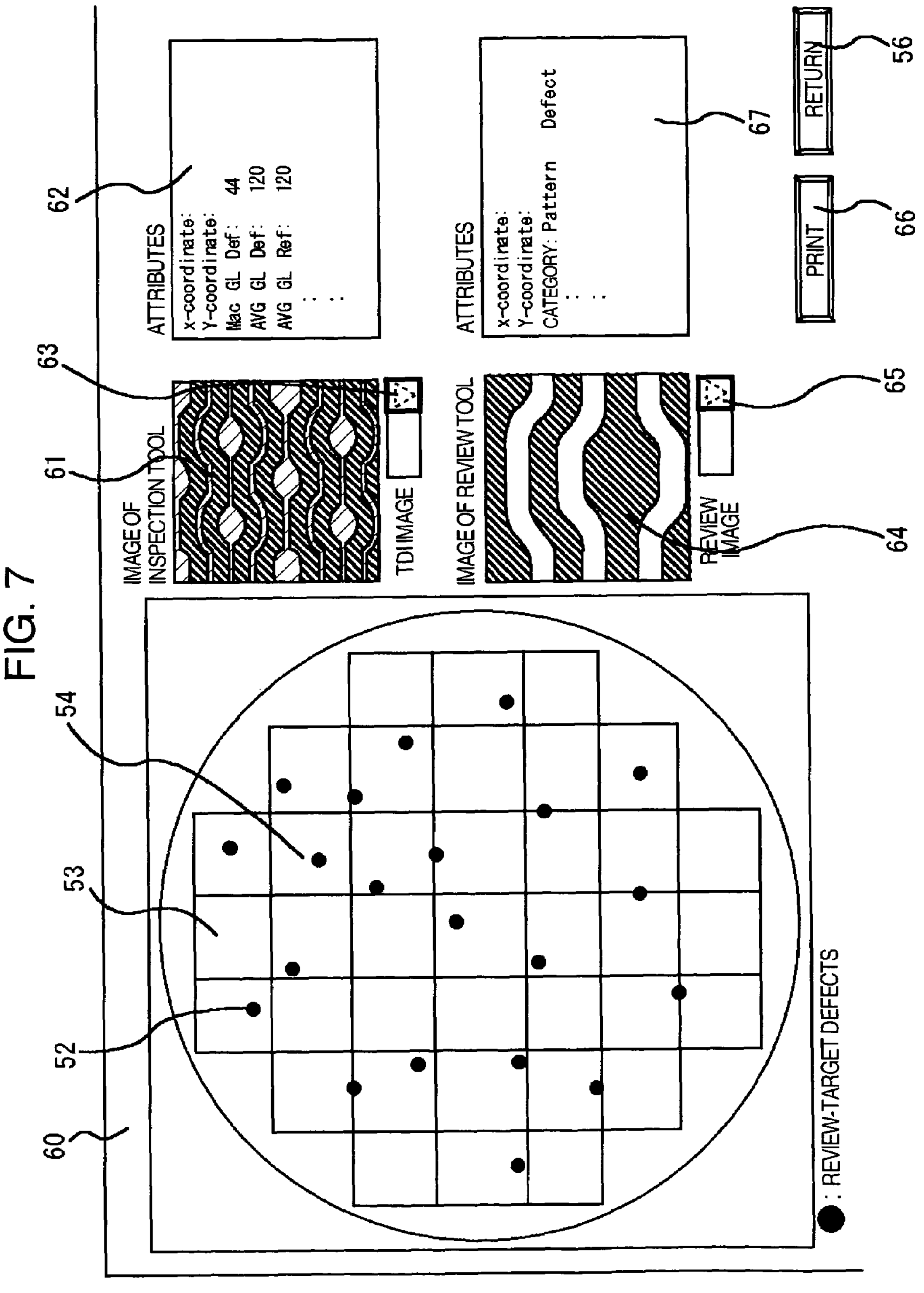
FIG. 7 is a window diagram for illustrating examples of displaying detailed information on the respective defects displayed in FIG. 4 and FIG. 5.

Pressing a button 41 for the detailed display within the window 30 in FIG. 4 switches the window 30 to a window 60 illustrated in FIG. 7. The window 60 includes the map 53, an ADR-image display section 61 outputted from the inspection tool, a pull-down menu 63 for selecting an image to be displayed on the ADR-image display section 61, a defect attributes list 62 outputted from the defect detection apparatus regarding the displayed defect, an image display section 64 outputted from the review tool, a pull-down menu 65 for selecting an image to be displayed on the image display section 64, a defect attributes list 67 outputted from the review tool regarding the defect displayed on the image display section 64, a button 66 for outputting the information displayed on the window 60 to a printer, and a button 56 for returning to the window 30 in FIG. 4. Here, on the map 53, the die layout based on the die-layout information outputted from the inspection tool is displayed, including the presence or absence of the review for a detection defect position. Clicking on any one of the detection defects displayed on the map 53, if an image exists, permits its image data and defect attributes to be displayed.

Figure 8:
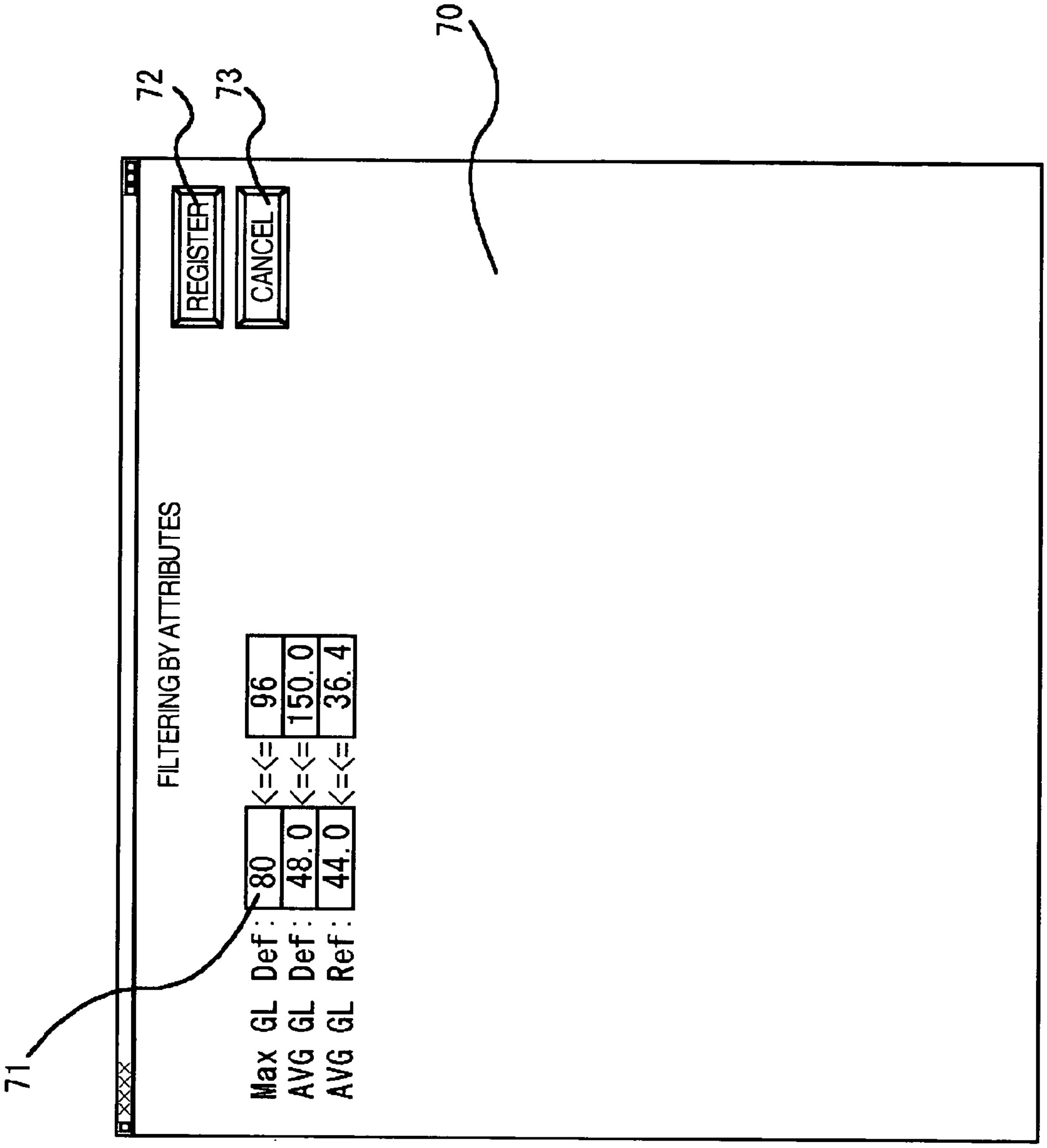
FIG. 8 is a window diagram in the case where the defects to be displayed in FIG. 4 and FIG. 5 are selected from an attribute range.

Next, clicking on the button 42 for the attribute filtering within the window 30 in FIG. 4 switches the window 30 to a window 70 illustrated in FIG. 8. The attribute range, i.e., the maximum value and minimum value, of a defect having attributes to be displayed on the window 30 in FIG. 4 is inputted into an attribute-range input field 71, then pressing a button 72 for the registration. This operation allows the defect having the attributes to be displayed to be displayed on the window 30 in FIG. 4. An attribute for which the attribute-range input field 71 is a blank field is not reflected on the display extraction. After having inputted a numerical number into attribute-range input field 71, if the display extraction is not wished to be reflected on the window 30 in FIG. 4, a cancel button 73 is just pressed. Incidentally, pressing either of the button 72 and the cancel button 73 switches this window back to the window 30 in FIG. 4 again.

Figure 9:
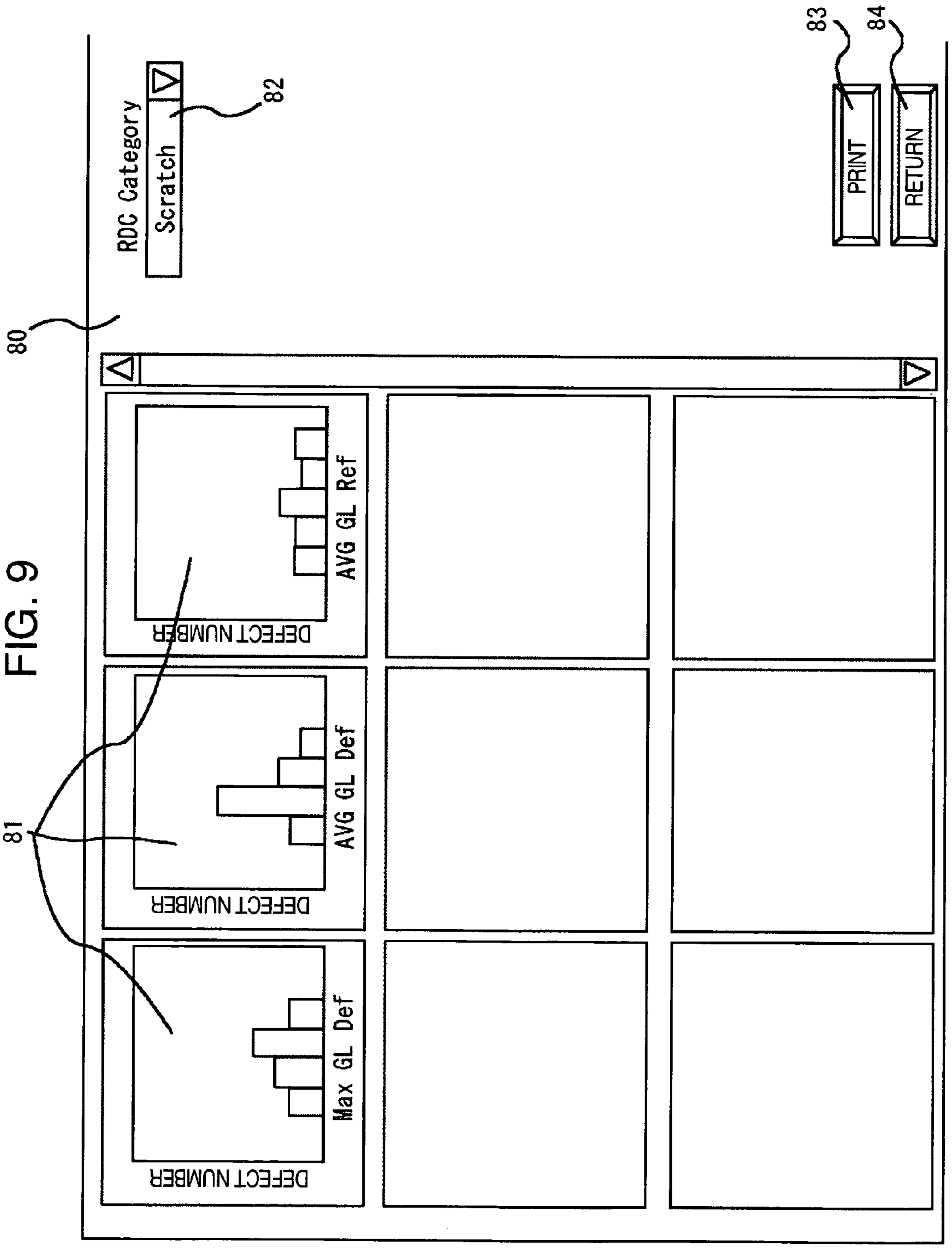
FIG. 9 is a window diagram for illustrating examples of displaying histograms for illustrating attribute distributions of the defects displayed in FIG. 4 and FIG. 5.

Pressing the button 43 within the window 30 in FIG. 4 displays a histogram display window 80 on each defect-attribute basis illustrated in FIG. 9. As a result of the above-described extraction operation, information included herein are displayed for the defects displayed on the window 30 in FIG. 4. Within the histogram display window 80, histograms 81 on each defect-attribute basis are enumerated. Moreover, a pull-down menu 82 is prepared for selecting information to be displayed on the histograms 81. This allows the histograms to be displayed on each RDC-result basis carried out on the review-tool side, thereby making it possible to easily grasp what types of defect attributes the defect in each mode has. The selection made by the pull-down menu permits the display on each defect-mode basis to be implemented by classifying the defect modes by color within the histograms. Pressing a printing button 83 outputs the histograms to the printer, if necessary. When necessary operations are over, pressing a button 84 returns the window 80 to the window 30 in FIG. 4.

Figure 10:
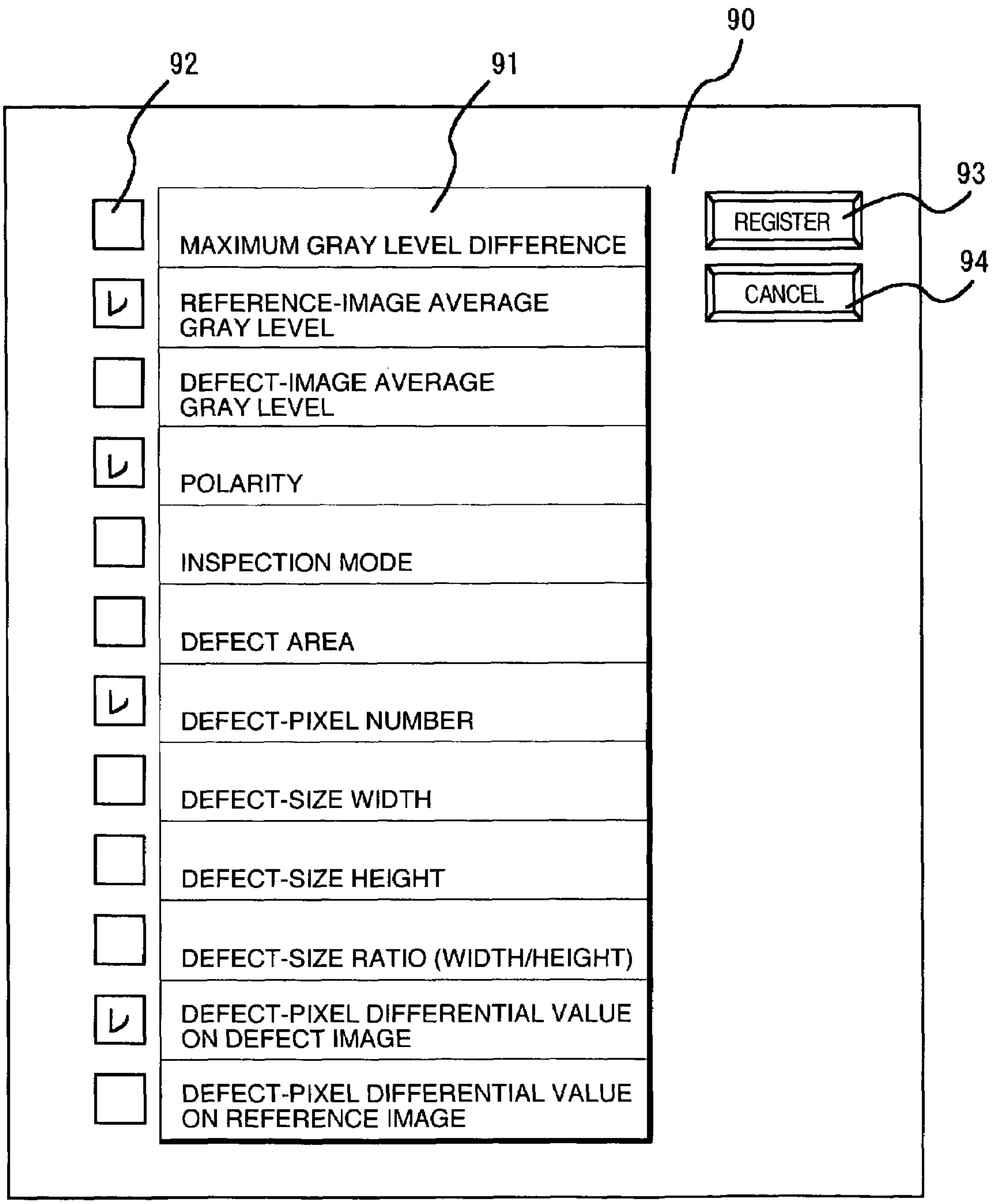
FIG. 10 is a window diagram for illustrating the case of selecting the attributes to be displayed in FIG. 4 and FIG. 5.
Figure 11:
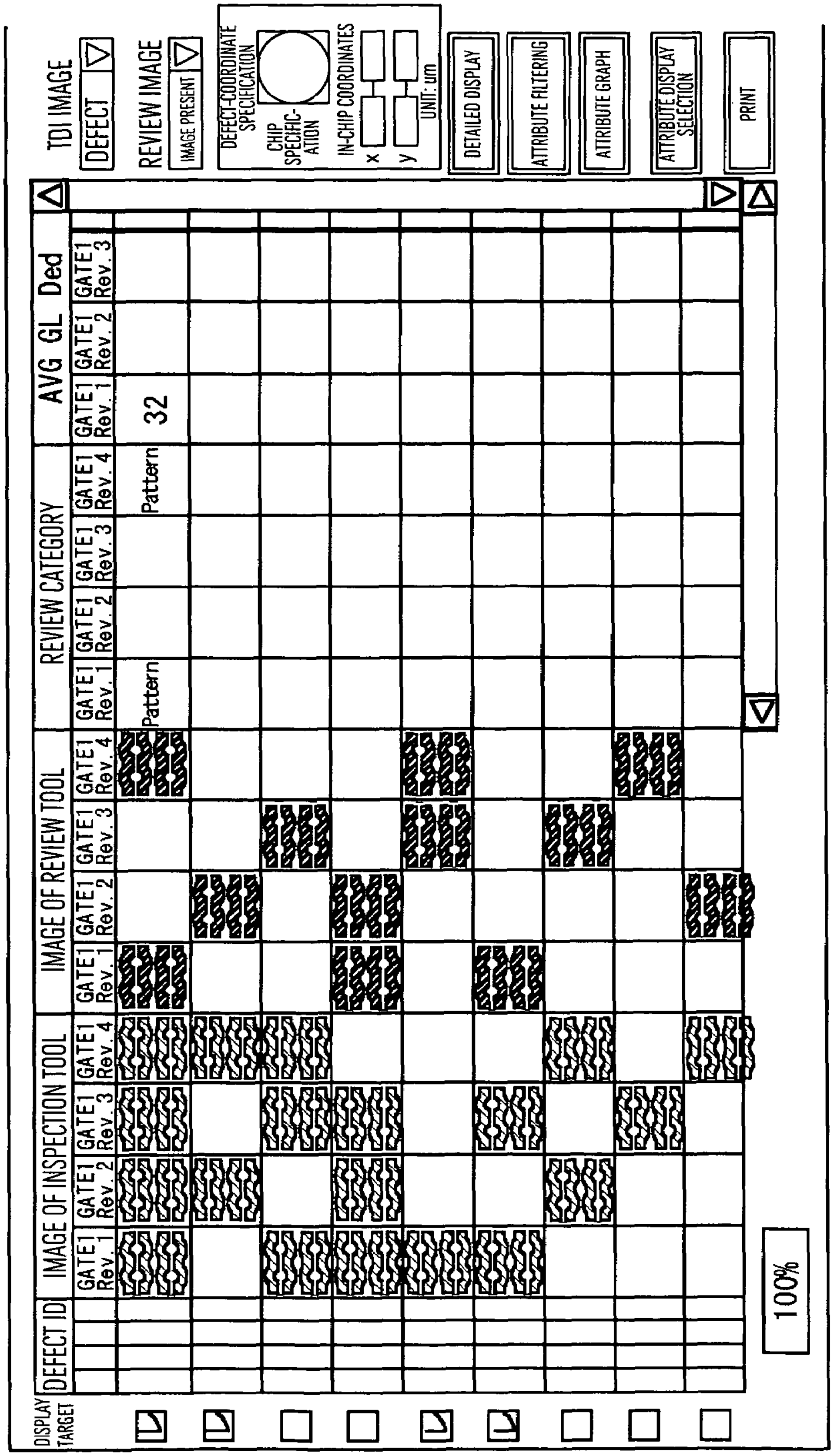
FIG. 11 is a window diagram displayed on the data processing apparatus as is the case with FIG. 4.

Next, pressing the button 44 within the window 30 in FIG. 4 causes a window 90 illustrated in FIG. 10 to appear over the window 30. The window 90 includes a list 91 of the defect attributes outputted from the inspection-tool side, and buttons 92 for selecting defect attributes which are wished to be displayed on the window 30 in FIG. 4. The several buttons 92 are clicked on to give the check-mark checks to the buttons selected, then pressing a registration button 93. This operation limits the defect attributes which will be displayed on the window 30 in FIG. 4. Namely, this operation makes it possible to reduce the information amount to be displayed on the window down to the smallest possible degree required, and is one of the devices for implementing efficiency improvement in the inspection operation. This is performed because there are some cases where, depending on the inspection, a small number of necessary attributes proves useful enough.

According to the present invention, the following processing apparatus is used on the condition that it is made possible to output the RDC attributes from the inspection tool: Namely, the processing apparatus processes the data outputted from the inspection tool and the one outputted from the review tool, then displaying the defect IDs, their image data, and RDC attributes in a manner of being organized and arranged side by side. Meanwhile, determination of the defect detection condition has been becoming increasingly difficult in accompaniment with development of the miniaturization design rule of semiconductor devices. However, the use of the above-described processing apparatus results in implementation of tremendous effects thereon, such as immediately providing clues for optimizing the inspection condition, and eventually, drastically decreasing the time needed until the optimization of the inspection condition.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A data processing apparatus configured to be connectable to an inspection tool for detecting defects of a target and a review tool for acquiring images of outward appearance of the defects via a communication network, wherein said data processing apparatus is configured to:

receive first defect information including coordinate information with regard to the defects detected by said inspection tool under a plurality of inspection conditions from said inspection tool;

receive second defect information being acquired by said review tool based on said coordinate information from said review tool; and display, on a display window of the data processing apparatus, the first defect information from said inspection tool and the second defect information from said review tool side by side in such a manner that images with regard to the defects which have been detected under the plurality of inspection conditions and judged to be the same defect based on the coordinate information are arranged in a same column or row.

2. The data processing apparatus according to claim 1, wherein said data processing apparatus is configured to select at least one selection condition used when selecting at least one of the first and second defect information to be displayed on said display window, or arbitrarily combine selection conditions through said selection.

3. The data processing apparatus according to claim 2, wherein at least said one selection condition is selected based on coordinate data on said defects detected by said inspection tool.

4. The data processing apparatus according to claim 2, wherein at least said one selection condition is determined based on the presence or absence of said images of said defects acquired by said review tool.

5. The data processing apparatus according to claim 1, wherein said data processing apparatus is configured to display, on said display window, defect attribute parameters of said defects as the first defect information outputted from said inspection tool.

6. The data processing apparatus according to claim 5, wherein said defect attribute parameters are acquired using a plurality of inspection conditions.

7. The data processing apparatus according to claim 1, wherein said data processing apparatus is configured to display, on said display window, said images of said defects as the first defect information outputted from said inspection tool.

8. The data processing apparatus according to claim 7, wherein said images of said defects are acquired using a plurality of inspection conditions.

9. The data processing apparatus according to claim 1, wherein said data processing apparatus is configured to display, on said display window, classification information on said defects classified by said review tool based on the first defect information from said inspection tool.

10. The data processing apparatus according to claim 1, wherein:

said first defect information outputted from said inspection tool includes at least said images and attribute parameters of said defects of said target to be detected, said review tool is configured to classify said defects based on the first defect information, and said second defect information from said review tool including said images includes classification information on said defects.

11. The data processing apparatus according to claim 1, wherein the first defect information from said inspection tool to be displayed on said display window corresponds to information of the defect which said review tool acquires.

12. An inspection-operation assistance system, comprising:

an inspection tool for detecting defects of a target to be detected under a plurality of inspection conditions, and outputting first defect information including coordinate information, a review tool for acquiring images of outward appearance of said defects based on said coordinate information, and a data processing apparatus for performing transfer/reception of information and images with said inspection tool and said review tool, and displaying, on a display window of the data processing apparatus, the first defect information from said inspection tool and second defect information from said review tool side by side in such a manner that images with regard to the defects which have been detected under said plurality of inspection conditions and judged to be the same defect based on the coordinate information are arranged in a same column or row.

13. The inspection-operation assistance system according to claim 12, wherein the first defect information outputted from said inspection tool includes at least said images and attribute parameters of said defects of said target to be detected, said review tool classifying said defects based on the first defect information, the second defect information from said review tool including said images including classification information on said defects.

14. The inspection-operation assistance system according to claim 12, wherein the first defect information from said inspection tool to be displayed on said display window corresponds to information of the defect which said review tool acquires.

15. A data processing method, comprising the steps of:

performing transfer/reception of information and images with a review tool and an inspection tool via a communication network, said review tool being configured to acquire images of outward appearance of defects based on first defect information including coordinate information under a plurality of inspection conditions output from the inspection tool, said inspection tool being configured to detect said defects of a target to be detected under the plurality of inspection conditions and output the first defect information, and displaying, on a display window of a data processing apparatus, the first defect information from said inspection tool and second defect information from said review tool side by side by side in such a manner images with regard to the defects which have been detected under the plurality of inspection conditions and judged to be the same defect based on the coordinate information are arranged in a same column or row.

16. The data processing method according to claim 15, wherein:

the first defect information outputted from said inspection tool includes at least said images and attribute parameters of said defects of said target to be detected, said review tool is configured to classify said defects based on the first defect information, the second defect information from said review tool including said images includes classification information on said defects.

17. The data processing method according to claim 15, wherein the first defect information from said inspection tool to be displayed on said display window corresponds to information of the defect which said review tool acquires.

18. The data processing apparatus according to claim 1, said images include an image transmitted from said inspection tool and an image transmitted from said review tool.

19. The inspection-operation assistance system according to claim 12, said images include an image transmitted from said inspection tool and an image transmitted from said review tool.

20. The data processing method according to claim 15, said images include an image transmitted from said inspection tool and an image transmitted from said review tool.

* * * * *